United States Patent [19]

Weldink

[11] Patent Number: 4,937,814
[45] Date of Patent: Jun. 26, 1990

[54] JUNCTION SWITCH FOR PACKET SWITCHING

[75] Inventor: Eric Weldink, Hilversum, Netherlands

[73] Assignee: American Telephone and Telegraph Company, New York, N.Y.

[21] Appl. No.: 341,989

[22] Filed: Apr. 21, 1989

[30] Foreign Application Priority Data

Apr. 29, 1988 [NL] Netherlands .................... 8801120

[51] Int. Cl.⁵ .............................................. H04J 3/00
[52] U.S. Cl. .................................... 370/60; 370/94.1
[58] Field of Search ............... 370/68, 105, 94.1, 942, 370/60, 60.1, 85

[56] References Cited

U.S. PATENT DOCUMENTS 4,507,782  3/1985  Kunimasa et al. ............... 370/60
4,603,416  7/1986  Servel et al. ..................... 370/60
4,787,082 11/1988  Delaney et al. .................. 370/85

Primary Examiner—Douglas W. Olms
Assistant Examiner—Christopher O. Edwards
Attorney, Agent, or Firm—Peter Visserman

[57] ABSTRACT

The invention relates to a switching module for asynchronous time multiplex comprising at least one junction switch for transmitting packet-switched information from one bus (14) to another bus (16). The junction switch comprises a translation memory (9) for translating packet addresses into new addresses, a comparator (10) for selecting the packets that are to be routed to another bus, a queue memory (12) for storing selected packets until an insertion circuit places the selected packets into the queue memory (12) on the other bus (16). With the aid of a such junction switch, a flexible network structure can be realized, the traffic of packets on the different buses can be mutually asynchronous and virtual circuits can be realized with the aid of the translation memory (9).

5 Claims, 2 Drawing Sheets

JUNCTION SWITCH FOR PACKET SWITCHING

BACKGROUND OF THE INVENTION

The invention relates to a switching module comprising at least one junction switch for connecting a first bus to a second bus to transmit packetized digital information having an address field and a data field.

A junction switch in such a switching module is used for switching through packetized digital information in telecommunication networks. An example in this context is a network in which two or a plurality of computers are coupled for exchanging digital information.

Different structures are known for the network configuration, such as for example the Banyan network, Prelude network, Orwell rings and the Time-division mutiplex bus. Each of the said network structures will presently be briefly discussed.

(a) Banyan network.

This network is known from an article entitled "Performance Analysis of a Packet Switch Based on Single-Buffered Banyan Network" from IEEE Journal on Selected Areas in Communications; VOL SAC-1, No. 6; Dec. 1983, pp. 1014–1021.

The Banyan network consists of a matrix of modules each having two inputs and two outputs. The value of an address bit from the address field of a packet determines the output of the module to which the packet is switched through. The output is connected to a next module which switches the packet through in the same manner depending on the value of the next address bit. In this way n module stages are required for an address field of n address biis. Thus, a property of the Banyan network is the fact that the size of the network is determined by the size of the address field and that the size of the network cannot be designed in dependence on the traffic need Furthermore, it is disadvantageous that when at any instant an equivalent address bit appears at the two inputs of a module, without further measures being taken, the information on that module is blocked, disturbing the throughput. To solve such problems, an intricate sorting mechanism would be required for sorting and distributing packets over the proper inputs.

(b) Prelude network

The Prelude network is known from the report of a conference of the GSLB, held in Albufeira, Portugal, 19–20 Jan. 1987; pp. 114–127.

A fixed number of ingoing and outgoing lines is connected to the Prelude network. The signals on the ingoing lines are presiochronous, that is to say, that the signals are nominally synchronous but no longer entirely synchronous with respect to each other owing to, for example, jitter and noise. In order to attain that the input signals are bit and word synchronous, a synchronization circuit is inserted between the ingoing lines and the rest of the switching network Furthermore, additional circuitry is present for shifting the packets with respect to each other on the ingoing lines over a time interval having the length of an address field. Consequently, the address fields can be transmitted to a control unit whilst being equally distributed in time. Subsequently, the packets are further switched through the rest of the switching network.

A disadvantageous property of the Prelude network is the fact that the number of ingoing lines is limited (that is to say, equal to the ratio of the number of data bits to the number of address bits); furthermore, the ingoing lines must not function asynchronously with respect to each other and much circuitry is required for synchronizing the ingoing lines and shifting the packets with respect to each other.

(c) Orwell rings.

This network is known from the report of a conference by the GSLB, held in Albufeira, Portugal; 19–20 Jan. 1987, pp.215–224.

The network comprises stations that are included in a ring-shaped bus This ring-shaped bus comprises one or a plurality of parallel rings. Frames containing digital information are transmitted on each ring.

This network has the disadvantageous property that the stations have to be synchronous with respect to each other; furthermore, the structure of the network cannot be simply changed into a structure different from the ring-shaped one and, in addition, the user capacity per station decreases as more stations are included in the ring, because there is a limitation to the used capacity of the bus. These properties form a restriction on the possibilities to use that network.

(d) Time-division multiplex bus.

Time-division multiplex buses are widely known. A number of ingoing data lines is connected via a multiplexer to a common time-division multiplex bus. Each ingoing line is read out during an associated time slot and the thus obtained data packet is placed onto the common bus during that time slot. Since the time slots belong to a fixed multiplex frame, the ingoing lines must not be asynchronous.

Each outgoing line that is connected to the common bus has a unique address. The outgoing lines jointly read the common bus and if a packet address field corresponds with an address of an outgoing line the packet is copied onto the relevant outgoing line.

In addition to the disadvantage that the ingoing lines must not be asynchronous, also high-speed buses are required when many lines are connected.

A known routing method with telecommunication networks is the use of virtual circuits. Virtual circuits are applied when a packet for a specific destination should be provided with a very long world address. To avoid this long world address, it is transmitted to a central control unit by a station wishing to commence transmission of the packets, which control unit establishes virtual circuits in response thereto. These virtual circuits are formed by issuing a Virtual Circuit Identifier, VCI for short, per section of the overall connection as well as the required routing information for these VCI values to the junctions in that section of the connection. These (much shorter) VCI values substitute for the world address. The central control unit informs each junction about the value the VCI of the arriving packet will have and which new value the VCI of that packet is to assume to route the packet to the next junction.

Each junction has a conversion table with a combination of two VCl values for each virtual circuit; one VCl associated to the arriving packet and one VCI with which that packet is to be routed further. When a packet arrives at a junction, the VCI of that arriving packet is looked up in the conversion table and replaced by the VCl that is associated to it according to the conversion table. Subsequently, the packet with the new VCI is routed to the next junction The VCl values associated to a virtual circuit cannot be used for other circuits as long as the virtual circuit is still in use Only after the central control unit has been informed that the communication can be terminated, the VCl values of the associated virtual circuits can be released by the central control unit.

SUMMARY OF THE INVENTION

The invention has for its object to provide a switching module with at least one junction switch enabling a flexible network structure, which is suitable for the implementation of the principle of the virtual circuit and in which the input lines can be mutually asynchronous and asynchronous relative to the output lines.

Thereto, the switching module according to the invention is characterized in that the junction switch comprises
  a translation memory
  * having a data input for receiving information words from an external central control unit,
  * having an address input to which the address field of the packets is applied,
  * and having a data output;
  a comparator
  * having an input which is connected to the data output of the translation memory, for comparing the information-word originating from this data output to a predetermined information-word,
  *and having an output;
  a queue memory in the form of an elastic buffer
  *having a first data input to which the data field of the packets is applied,
  *having a second data input which is connected to the data output of the translation memory,
  * and having a write-enable input which is connected to the comparator output for bringing the queue memory into the write position;
  an insertion circuit inserted into the second bus and comprising:
  * a detection circuit for detecting an empty packet on the second bus,
  * and a write circuit controlled by the detection circuit for writing in the empty packet a packet originating from the data output of the queue memory.

By implementing the measures according to the invention, it is achieved that the translation memory replaces an address field of a packet by an information word indicating either a new VCl value or an empty-packet code. Under the control of a central control unit and via the data input of the translation memory, this information word is written into a memory location of this translation memory, whose address is placed onto the address input of the translation memory by the same central control unit If this information word matches the empty-packet code, the writing of that packet into the queue memory is inhibited; thus, such a packet is not switched through to the second bus, but proceeds on its way on the first bus as do the packets that have indeed been switched through to the second bus. If the comparator establishes that the information word does not match the empty-packet code, the packet carrying a new VCl value and an associated data field is written into the queue memory and placed onto the second bus when available packet space on the second bus is detected by the insertion circuit. By means of this selection the junction switching function is realised.

Because the packets that have to be routed from the first bus to the second bus first have to be placed into a queue memory and, subsequently, must wait for available packet space on the second bus, the first bus and the second bus house independent timing controls.

The network can be structured entirely according to the traffic needs. When somewhere in the network the traffic needs are great, many buses will be required there. With the junction switch according to the invention the associated need for junction switches can then be simply met. So doing it is avoided that the queue memories overflow because the traffic supply is too big and hence information is lost.

The switching module according to the invention is further characterized in that the insertion circuit comprises:
  a serial/parallel register for packet information which is connected in a series arrangement with the second bus
  * having a serial data input which is connected to the receiving side of the second bus,
  * having a serial data output which is connected to the unload side of the second bus,
  * having a parallel data input,
  * and having a parallel data output;
  an address length counter
  * having an input which is connected to the second bus for receiving clock pulses from that bus,
  * having a reset input which is also connected to the second bus for receiving packet synchronization pulses from that bus,
  * and having an output;
  a buffer
  * having a write-enable input which is connected to the output of the address length counter,
  * having a data input which is connected to the parallel data output of the serial/parallel register,
  * and having a data output;
  a second comparator
  * having an input which is connected to the buffer data output for comparing the information word originating from this data output to a predetermined information word,
  * and having an output;
  gate means for supplying to the parallel data input of the serial/parallel register the packet occurring at the output of the queue memory in dependence on the signal at the output of the second comparator.

A serial/parallel register is a register permitting both serial and parallel reading and writing. A packet on the second bus is serially written into the serial/parallel register.

With the aid of the address length counter, the address field of a packet position on the second bus is written in parallel in to the buffer memory and with the aid of the second comparator it is detected whether this address contains the empty-packet code, so that this packet position can be filled with a packet from the queue memory The switching module according to the invention is further characterized in that the junction switch comprises a second and a third buffer which are serially connected to the first and the second bus, respectively, the second and the third buffer comprising a clock input connected to the respective clock channels of the first and the second bus, and a reset input connected to the clock input through a delay element.

Buffers are placed on the respective transmitting sides of the first bus and the second bus. These buffers are used for eliminating phase differences between the packet bits and the clock bits, which phase differences may be introduced by the junction switch. Furthermore, this achieves that the duration of the clock pulses maintains substantially the same value, so that it is impossible that owing to the accumulation of the pulse duration a clock period would be completely filled by one clock pulse, so that one clock period would be skipped.

BRIEF DESCRIPTION OF THE DRAWING

The invention and its advantages will now be further explained with reference to the drawing, in which.

DETAILED DESCRIPTION

Figure 1:
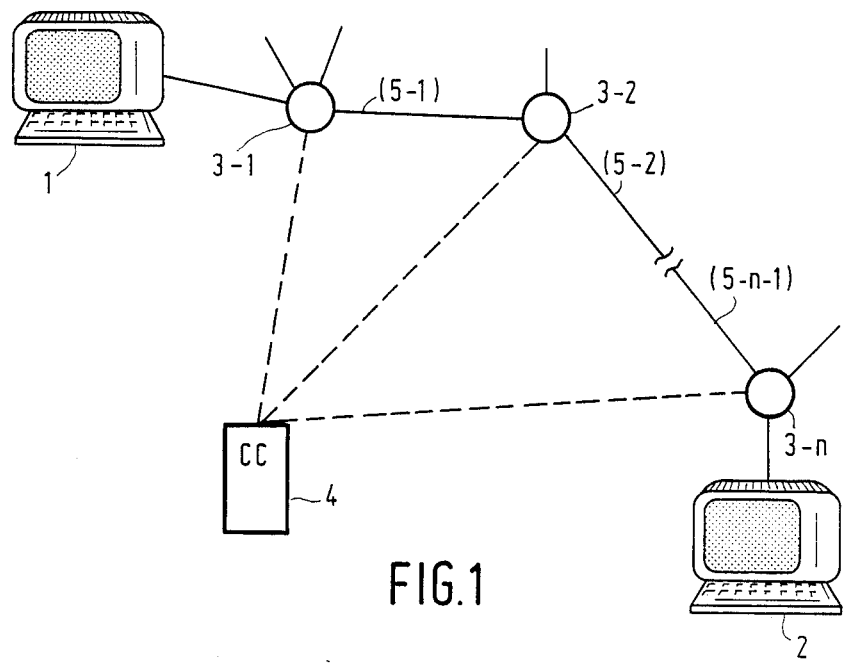
FIG. 1: shows a diagram of a packet-switched network operating with virtual circuits.

In packet-switched communications virtual circuits can be used of which an example is shown in FIG. 1.

It is assumed that terminal station 1 wishes to transmit information to terminal station 2. Each terminal station in this network is characterized by a unique world number that, in analogy with the already existing telephone network, can consist, for example, of a subscriber number and possibly an area code and a country code. In order to avoid that a long world number leads to an extremely long packet address, a central control unit 4 forms virtual circuits comprising the respective junctions 3-1, 3-2 to 3-n between terminal station 1 and terminal station 2, the central control unit 4 assigning to the interjunction connections the respective VCI (VCI=Virtual Circuit Identifier) values 5-1, 5-2, 5-n-1. When junction 3-1 receives a packet from terminal station 1, junction 3-1 routes this packet to junction 3-2 having VCl value 5-1. Junction 2 looks up the value 5-1 in its conversion table and finds there the value 5-2. The packet is then routed with VCl value 5-2. Finally, this packet arrives at junction 3-n having VCI value 5-n-1. In the conversion table of junction 3-n it is stated that arriving packets having the VCI value 5-n-1 are to be routed to the exit which is connected to the terminal station 2.

Since the junction switch according to the invention comprises a translation memory capable of translating the address codes, this junction switch is pre-eminently suitable for use in virtual circuits.

Figure 2:
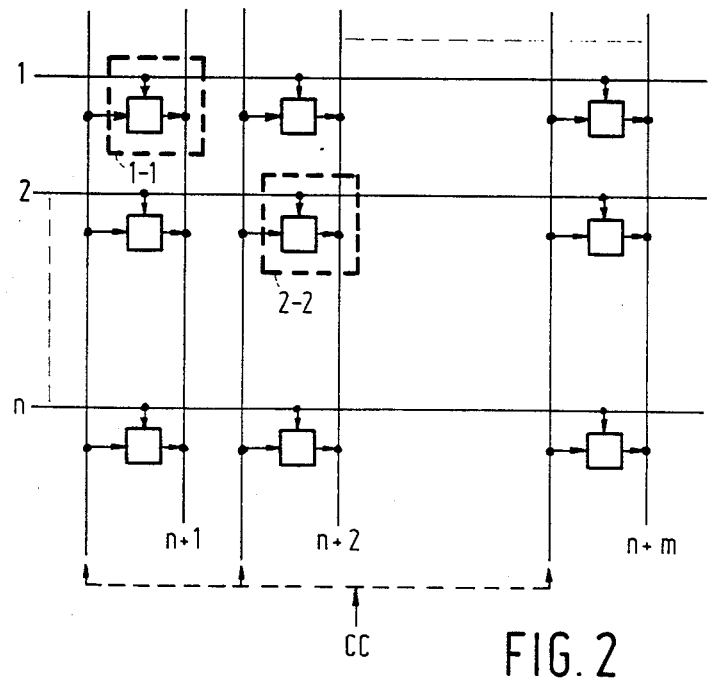
FIG. 2: shows a diagram of a switching module with junction switches according to the invention.

FIG. 2 shows a switching module having n ingoing buses referenced 1 to n and m outgoing buses referenced n+1 to n+m.

For each communication between one of the n ingoing buses and one of the m outgoing buses, a junction switch is always used whose input is connected to the associated ingoing bus and whose output is connected to the associated outgoing bus. These junction switches are used for routing the digital information through the network.

Figure 3:
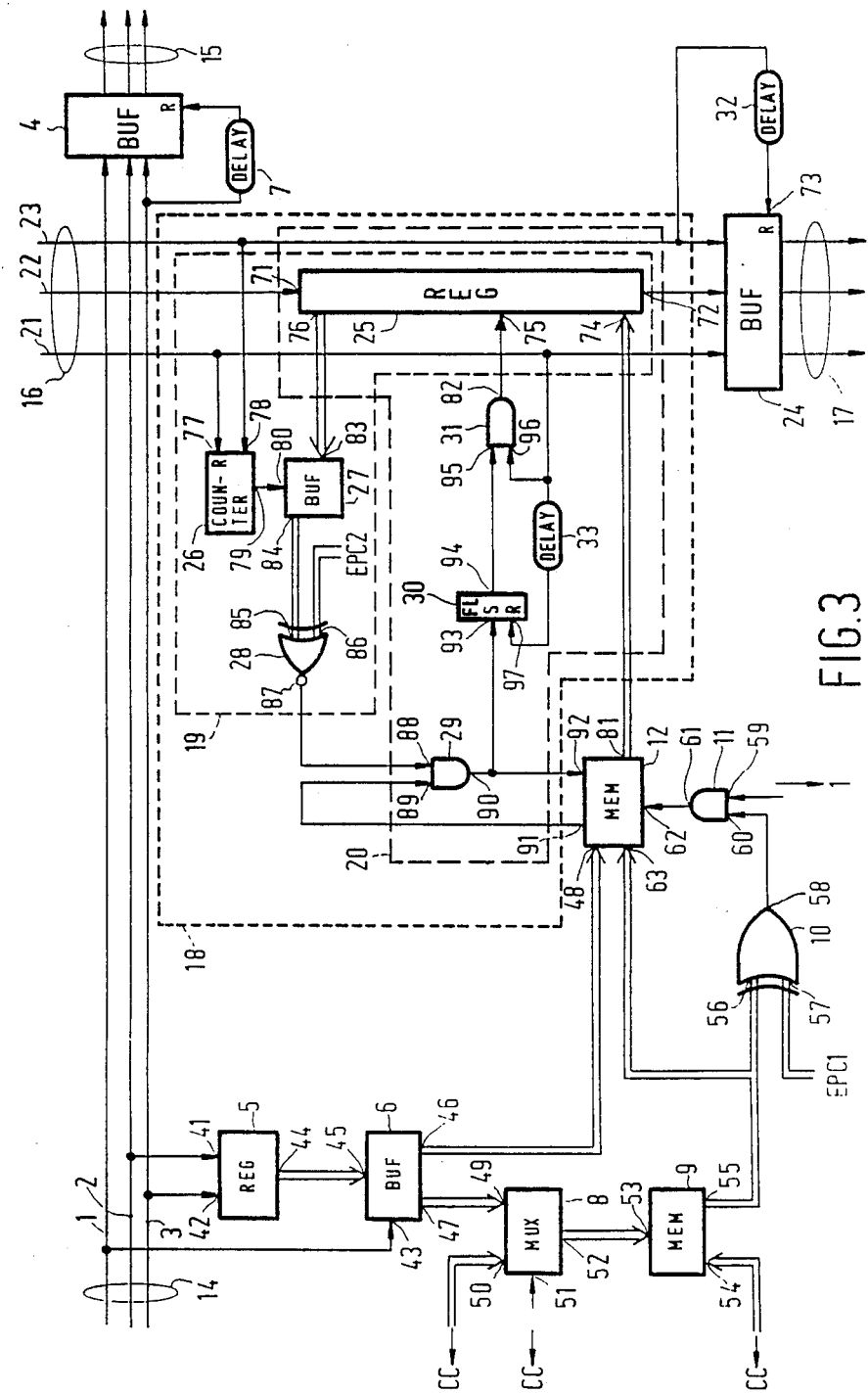
FIG. 3: shows a circuit diagram of a junction switch according to the invention.

FIG. 3 shows an embodiment of a change-over switch according to the invention. The unload side of a first bus 14 accommodates a buffer 4.

This bus 14 comprises three conductors 1, 2 and 3, conductor 1 being used for conveying the packet synchronization signal for the packets which are transmitted via conductor 2 of the first bus 14. These packets consist of an address field and a data field. The conductor 3 conveys the clock signal for the bit synchronization on conductors 1 and 2 and is connected via a time delay element 7 to the reset input of buffer 4. The descending edge in a clock pulse is then related with a fixed time to the ascending edge so that the clock pulse cannot fill a complete clock period as a result of various mutual delays in the ascending and descending edges.

The conductors 2 and 3 are connected to data input 41 and clock input 42, respectively, of the register 5. The packets are bit-serially read into the register 5.

The conductor 1 is connected to the write-enable input 43 of buffer 6. The data input 45 of the buffer 6 is connected in a parallel arrangement with data output 44 of register 5, so that a packet in register 5 is written in parallel into buffer 6 in dependence on the packet synchronization signal on conductor 1.

A first data output 46 of buffer 6 is connected to data input 48 of queue memory 12 to enable a packet data field to be written in Parallel into the queue memory 12; the other data output 47 of buffer 6 is connected to data input 49 of multiplexer 8 for transmitting thereto in parallel a packet address field. This address field forms a VCI value Multiplexer 8 has a bit-parallel output 52 which is connected to the address input 53 of translation memory 9. A parallel data input 50 of multiplexer 8, a selection input 51 of multiplexer 8 and a data input 54 of translation memory 9 are coupled to the central control unit CC.

The parallel data output 55 of translation memory 9 is connected to input 56 of comparator 10 and a predetermined information word EPC1 indicating an empty packet is applied to the other input 57 of comparator 10. The parallel data output 55 of translation memory 9 is also connected to data input 63 of queue memory 12. The output 58 of comparator 10 is connected to input 60 of AND gate 11 whose input 59 is connected to conductor 1 of bus 14 for the packet synchronization. The output 61 of AND gate 11 is connected to the write-enable input 62 of queue memory 12.

Via data input 49 of multiplexer 8 a VCI value coming from buffer 6 and via data input 50 of multiplexer 8 a memory address coming from the central control unit CC can be conveyed to the address input 53 of translation memory 9. Depending on the value of the selection signal at selection input 51 of multiplexer 8 either the VCL value from buffer 6 or the memory address is applied to the address input 53 of translation memory 9. If a memory address coming from the central control unit CC is delivered, an information word forming a new VCI value or denoting an empty packet is written into the translation memory at the address concerned. If a VCI value coming from buffer 6 is applied to the address input 53 of translation memory 9, the information word is read out at the address concerned and appears at data output 55. This information word is then applied to input 56 of comparator 10 and data input 63 of queue memory 12. Comparator 10 compares the information word at input 56 to the empty packet code EPC1 which is delivered to input 57 of comparator 10 and if they do not match, the write-enable input 62 of queue memory 12 is activated via AND gate 11. This results in the new VCI value and the associated data field being written in simultaneously via the respective data inputs 48 and 63 of queue memory 12. If comparator 10 establishes that the data word and the empty packet code EPC1 match, the write-enable input 62 of queue memory 12 is not activated. This is the case with packets that need not be switched through from bus 14 to bus 17 on the basis of their destination. The address field and the data field at the respective data inputs 48 and 63 of queue memory 12 are now discarded.

The packet which is written into queue memory 12 is switched through to the second bus 17 by an insertion circuit 18. This insertion circuit 18 comprises a detection circuit 19 for establishing the presence of free packet space on the second bus 16, and a write circuit 20 for writing in that case a packet from queue memory 12 into the empty packet space On the unload side of the second bus 16 a buffer 24 is arranged. This bus 16 comprises three conductors 21, 22 and 23, of which conductor 21 is used for transporting the packet synchronization signal for the packets that are transmitted from bus 16 via conductor 22. Conductor 23 conveys the clock signal for the bit synchronization of the packets on the conductors 21 and 22 and, via delay element 32, is connected to the reset input 73 of buffer 24. This is done to avoid a clock period being skipped in the clock signal as is represented with reference to the description of buffer 4. The conductors 21 and 23 are directly connected to buffer 24 and conductor 22 is connected to buffer 24 via serial/parallel register 25.

The serial/parallel register 25 comprises a serial data input 71 connected to the packet conductor 22, a parallel data input 74 connected to data output 81 of queue memory 12, a write-enable input 75 connected to output 82 of AND gate 31, a serial data output 72 connected to packet conductor 22 and a parallel data output 76 connected to data input 83 of buffer 27.

The conductor 21 is connected to reset input 77 of counter 26 and conductor 23 to clock input 78 of the counter 26. The output 79 of counter 26 is connected to the write-enable input 80 of buffer 27.

The parallel data output 84 of buffer 27 is connected to input 85 of comparator 28. A predetermined information word EPC2, denoting an empty packet code, is applied to the other input 86 of comparator 28. The output 87 of comparator 28 is connected to input 88 of AND gate 29 whose input 89 is connected to queue-empty output 91 of queue memory 12. The output 90 of AND gate 29 is connected to the readenable input 92 of queue memory 12 and set input 93 of FLIP-FLOP 30.

The reset input 97 of FLIP-FLOP 30 is connected to packet conductor 21 via a delay gate 33. AND-gate 31 has two inputs 95 and 96, input 95 of which is connected to output 94 of FLIP-FLOP 30 and input 96 of which is connected to packet synchronization conductor 21.

The packets on conductor 22 are bit serially applied to data input 71 of serial/parallel register 25. The counter 26 counts the number of bits from the packet synchronization pulse, which is serially applied to serial/parallel register 25 until the complete address field of a packet is written into serial/parallel register 25. Subsequently, under the control of a write-enable signal on write-enable input 80 of buffer 27, the address field is written in parallel into buffer 27. Comparator 28 compares the address field in buffer 27 to empty-packet code EPC2. If the address field at input 85 is equal to the empty-packet code EPC2 at input 86 of comparator 28 and also queue memory 12 comprises a packet, the output signal of AND gate 29 activates the read-enable input 92 of queue memory 12 to read out the next packet in queue memory 12 The output signal of AND gate 29 is likewise applied to set input 93 of FLIP-FLOP 30 so that a take-over signal appears at output 94 of FLIP-FLOP 30..As this take-over signal is presented at output 94 of FLIP-FLOP 30 and a packet synchronization pulse at input 96 of AND gate 31, write-enable input 75 of serial/parallel register 25 is activated. The delay gate 33 which is connected to the reset input 97 of FLIP-FLOP 30 has a delay amounting to approximately a half clock pulse. With this delay, it is avoided that the takeover signal at output 94 of FLIP-FLOP 30 has changed value before the write-enable input 75 of serial/parallel register 25 can be activated by means of the make-over signal and a packet synchronization pulse on the respective inputs of AND gate 31. At the instant when the packet bit positions in serial/parallel register 25 match the packet bits on the parallel data input 74, the packet on output 81 of queue memory 12 is written in parallel into serial/parallel register 25. This achieves that a packet on bus 14 is routed to bus 17, thus realising the junction function of the switch.

What is claimed is:

1. A switching module comprising at least one junction switch for connecting a first bus to a second bus for transmitting digital information by way of packets having an address field and a data field, characterized in that the junction switch comprises:

a translation memory
* having a data input for receiving information words from an external central control unit,
* having an address input to Which the address field of the packets is applied,
* and having a data output;

a comparator
* having an input which is connected to the data output of the translation memory, for comparing the information-word originating from this data output to a predetermined information-word,
* and having an output;

a queue memory in the form of an elastic buffer
* having a first data input to which the data field of the packets is applied,
* having a second data input which is connected to the data output of the translation memory,
* and having a write-enable input which is connected to the comparator output for bringing the queue memory into the write position;

an insertion circuit inserted into the second bus and comprising:
* a detection circuit for detecting an empty packet on the second bus,
* and a write circuit controlled by the detection circuit for writing in the empty packet a packet originating from the data output of the queue memory.

2. A switching module as claimed in claim 1, characterized in that the insertion circuit comprises:

a serial/parallel register for packet information which is connected in a series arrangement with the second bus
having a serial data input which is connected to the transmit side of the second bus,
* having a serial data output which is connected to the receiving side of the second bus,
* having a parallel data input,
* and having a parallel data output;

an address length counter
* having an input which is connected to the second bus for receiving clock pulses from that bus,
* having a reset input which is also connected to the second bus for receiving packet synchronization pulses from that bus,
* and having an output;

a buffer
* having a write-enable input which is connected to the output of the address length counter,

* having a data input which is connected to the parallel data output of the serial/parallel register,
* and having a data output;

a second comparator
* having an input which is connected to the buffer data output for comparing the information word originating from this data output to a predetermined information word,
* and having an output;

gate means for supplying the parallel data input of the serial/parallel register the packet occurring at the output of the queue memory in dependence on the signal at the output of the second comparator.

3. A switching module as claimed in claim 1 or 2, characterized in that the junction switch comprises a second and a third buffer which are serially connected to the first and the second bus, respectively, the second and the third buffer comprising a clock input connected to the respective clock channels of the first and the second bus, and a reset input connected to the clock input through a delay element.

4. A switching module as claimed in claim 1 or 2, characterized in that the junction switch comprises a multiplexer which includes:

a first data input which is linked to the first bus, a second data input which is connected to the central control unit, a data output which is connected to the address input of the translation memory, and a selection input which is connected to the external central control unit for optionally connecting the first data input to the address input of the translation memory or the second data input to the address input of the translation memory.

5. A switching module as claimed in claim 3 characterized in that the junction switch comprises a multiplexer which includes:

a first data input which is linked to the first bus.

a second data input which is connected to the central control unit, a data output which is connected to the address input of the translation memory, and a selection input which is connected to the external central control unit for optionally connecting the first data input to the address input of the translation memory or the second data input to the address input of the translation memory.

* * * * *